(12) United States Patent
Häggman

(10) Patent No.: US 6,406,415 B1
(45) Date of Patent: Jun. 18, 2002

(54) APPARATUS FOR FORMING A CONTAINER

(75) Inventor: Jaako Häggman, Helsinki (FI)

(73) Assignee: UPM-Kymmene Corporation, Valkeakoski (FI)

( * ) Notice: Subject to any disclaimer, the term of this patent is extended or adjusted under 35 U.S.C. 154(b) by 0 days.

(21) Appl. No.: 09/716,524

(22) Filed: Nov. 20, 2000

Related U.S. Application Data

(63) Continuation of application No. PCT/FI99/00397, filed on May 12, 1999.

(30) Foreign Application Priority Data

May 20, 1998 (FI) ................................................ 981121

(51) Int. Cl.[7] ................................................ B31B 1/90
(52) U.S. Cl. ........................ 493/105; 493/108; 493/123; 493/164; 493/247; 493/256; 493/298; 493/306; 493/315
(58) Field of Search ................................ 493/81, 105, 108, 493/123, 164, 247, 252, 253, 256, 298, 300, 306, 315

(56) References Cited

U.S. PATENT DOCUMENTS

| | | | |
|---|---|---|---|
| 3,049,979 A | * | 8/1962 | Sayford, Jr. |
| 4,250,798 A | | 2/1981 | Yamato et al. |
| 4,285,750 A | | 8/1981 | De Martino |
| 4,317,323 A | * | 3/1982 | Richards et al. ............... 53/563 |
| 4,334,875 A | * | 6/1982 | Eckert .......................... 493/303 |
| 4,559,765 A | * | 12/1985 | Cress et al. .................... 53/557 |
| 5,120,292 A | | 6/1992 | Uedo et al. |
| 5,324,249 A | * | 6/1994 | Konzal ........................ 493/109 |

FOREIGN PATENT DOCUMENTS

| | | |
|---|---|---|
| CH | 676217 | 12/1990 |
| EP | 417864 | 3/1991 |

OTHER PUBLICATIONS

Search Report from PCT/FI99/00397.

* cited by examiner

Primary Examiner—Rinaldi I. Rada
Assistant Examiner—Christopher Harmon
(74) Attorney, Agent, or Firm—Fitch, Even, Tabin & Flannery

(57) ABSTRACT

The apparatus for forming a container is situated in a container-forming unit comprising different processing stations. The apparatus for forming a container includes a wrapping mandrel attached to a moving structure, which is arranged to move the wrapping mandrel between different processing stations, and the members for feeding the blank to the wrapping mandrel. The apparatus for forming the container also has members to wrap the blank around the wrapping mandrel in order to form a structure that is closed in the horizontal cross-section perpendicular to the longitudinal axis. The wrapping mandrel is equipped with suction openings distributed on its perimeter, which openings are connected to the air duct in order to wrap the blank around the wrapping mandrel with the aid of suction.

8 Claims, 5 Drawing Sheets

APPARATUS FOR FORMING A CONTAINER

Figure 1:
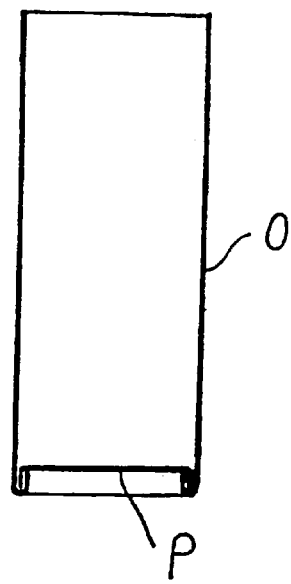

This is a continuation of prior application number PCT/FI99/00397, filed May 12, 1999 designating the U.S. which is hereby incorporated herein by reference in its entirety.

The present invention relates to an apparatus for forming a container which is of the type presented in the preamble to the attached claim 1.

It is known to a person skilled in the art to form from liquid packaging board cylindrical containers which comprise a vertical cylindrical casing formed by joining together the opposite sidewall margins of the blank with heat-sealable coating, and end members closing the sidewall blank at the top and bottom, the upper end member having an opening closed, for example, with a closure cap or a closing flap. Containers of the type described above are used in packaging different beverages in a sterile and airtight manner.

The container into which the material to be conserved, for example a beverage, is fed later, is formed automatically in a container-forming unit in which there is a set of so called wrapping mandrels around which the casing is formed by wrapping. The wrapping mandrels are placed in a rotating structure, which moves the mandrels between different processing stations. At each station one operation is carried out at a time, and thus a can-shaped casing is gradually formed, then removed from the mandrel at the last processing station and conveyed to a filling unit for filling and closing.

The apparatus described above is known in the prior art, and described for instance in European patents EP-B1-0 038 488 and EP-B1-0 018 470. The solutions presented in the said patents are characterised especially in that the blank is wrapped around the mandrel by using a mechanical pressing means which presses one end of the blank against the outer side surface of the mandrel and moves with the rotating movement of the mandrel, which pulls the blank around the mandrel and forms a closed structure, after which the side sealing is performed. In the patent EP-B1-0 018 470 there is also presented a particular securing member device, which ensures that the blank remains against the outer surface of the mandrel during the rotational movement of the mandrel. The wrapping phase described above requires many moving mechanical parts, in addition to which the mandrel must be arranged to be rotating.

The objective of the present invention is to eliminate the disadvantages described above and to present an apparatus in which the wrapping phase can be made simpler with at least the same reliability of operation, in addition to which the structure of the apparatus for forming a container is simplified. To achieve this, the container-forming apparatus in accordance with the invention is mainly characterised in that which is presented in the characterising part of the attached claim 1.

The container-forming apparatus is characterised in that the outer surface of the wrapping mandrel has suction openings around the whole perimeter of the mandrel, and these suction openings are connected to a source of underpressure in order to pull the blank around the mandrel. This means that mechanical means are not needed for wrapping except if needed, as auxiliary means, and in addition to this the mandrel can be arranged so as to be non-rotating in the structure holding and moving the mandrel, i.e. no additional transmission is needed in the container-forming apparatus for the rotational movement. With the aid of the suction, the wrapping tension can also be adjusted, allowing for the rigidity of the blank.

A vertical row of suction openings at one specific point on the perimeter of the mandrel is presented in the publication EP-B1-0 038 488 mentioned above. These suction openings do not cause the wrapping of the blank around the mandrel and they are not directly in contact with the inner surface of the blank, because they are designed only for positioning the separate strip functioning as an aid to sealing before the actual mechanical wrapping.

As regards the other advantageous embodiments of the present invention, reference is made to the dependent claims attached and to the explanations described later.

Figure 2:
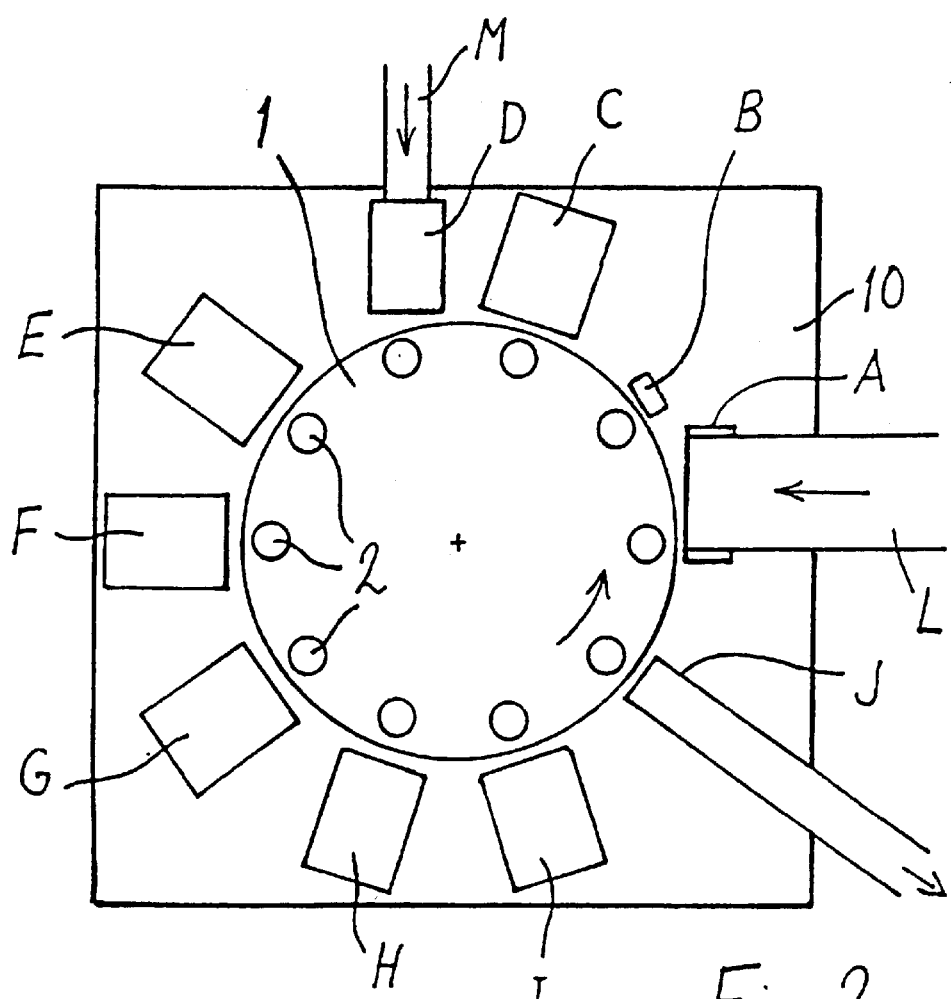
Figure 3:
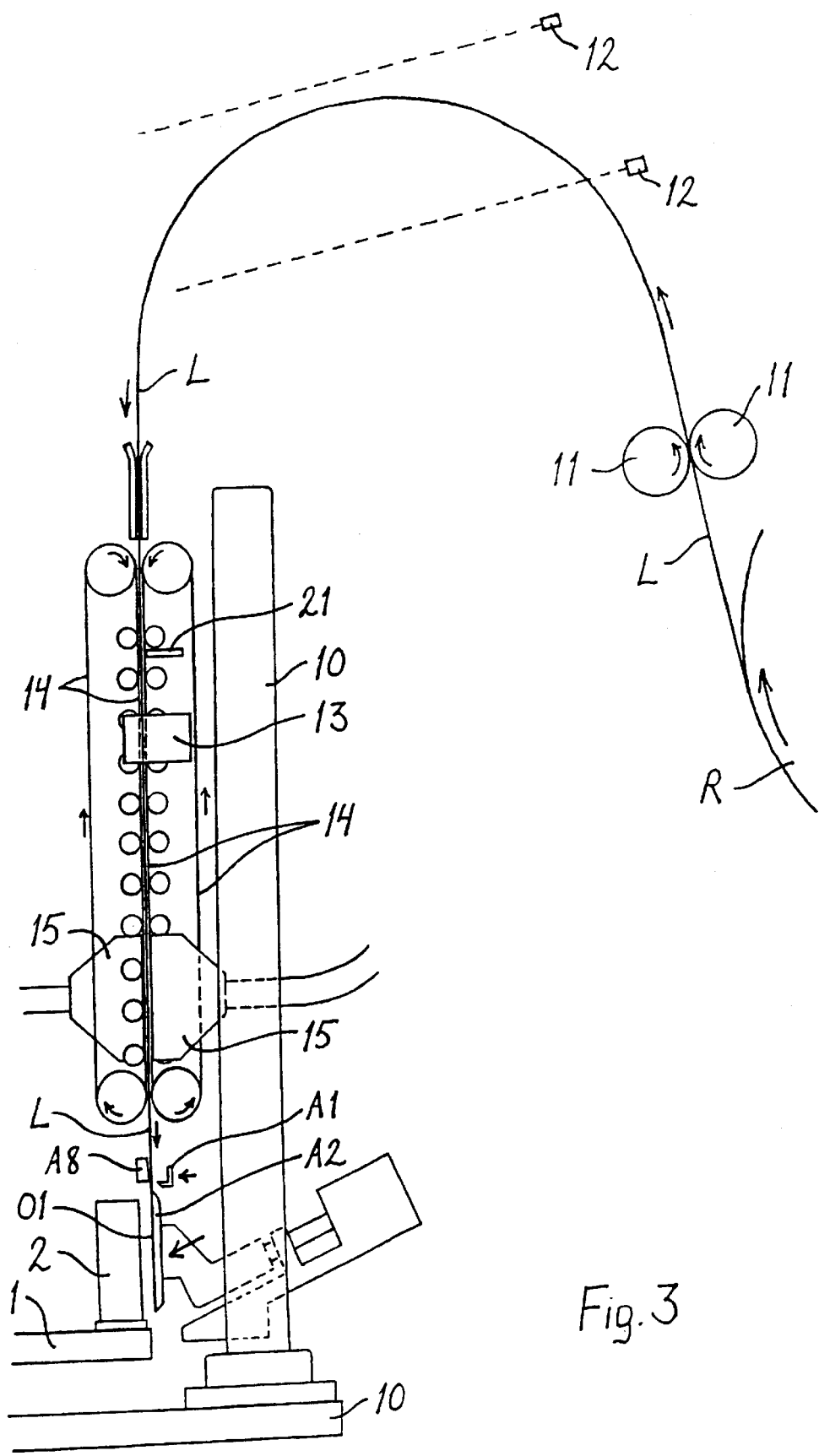
Figure 4:
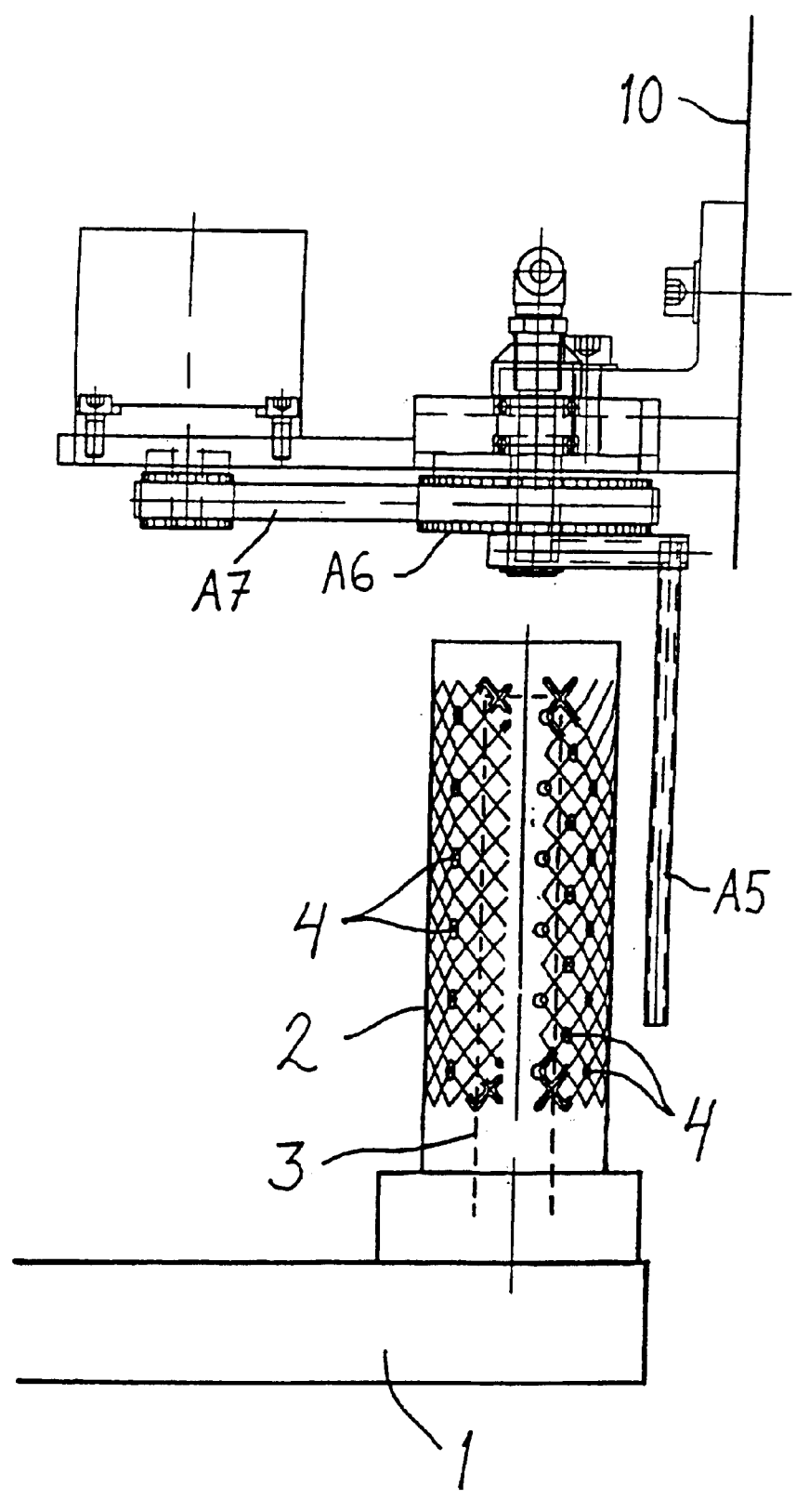
Figure 5:
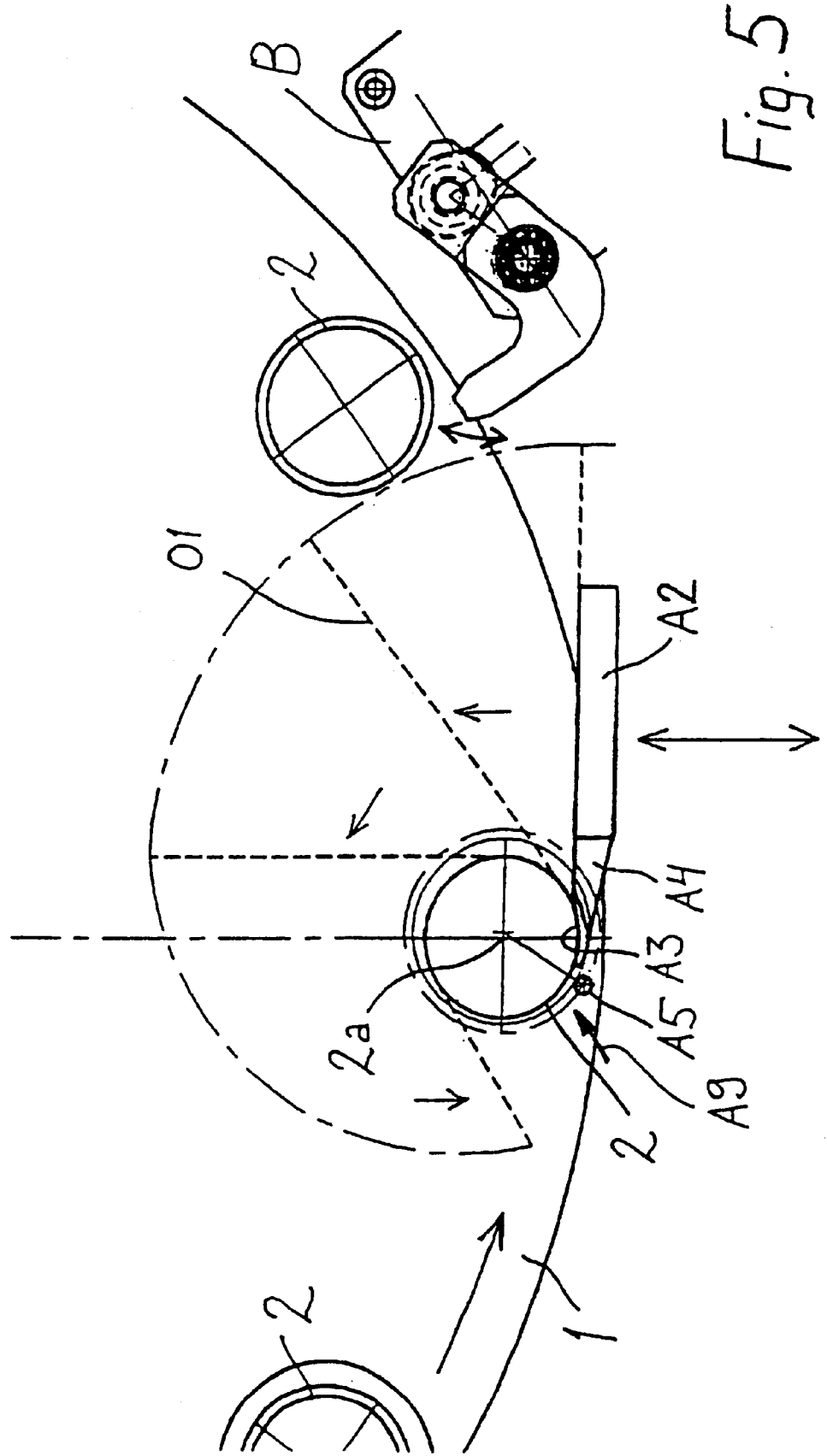
Figure 6:
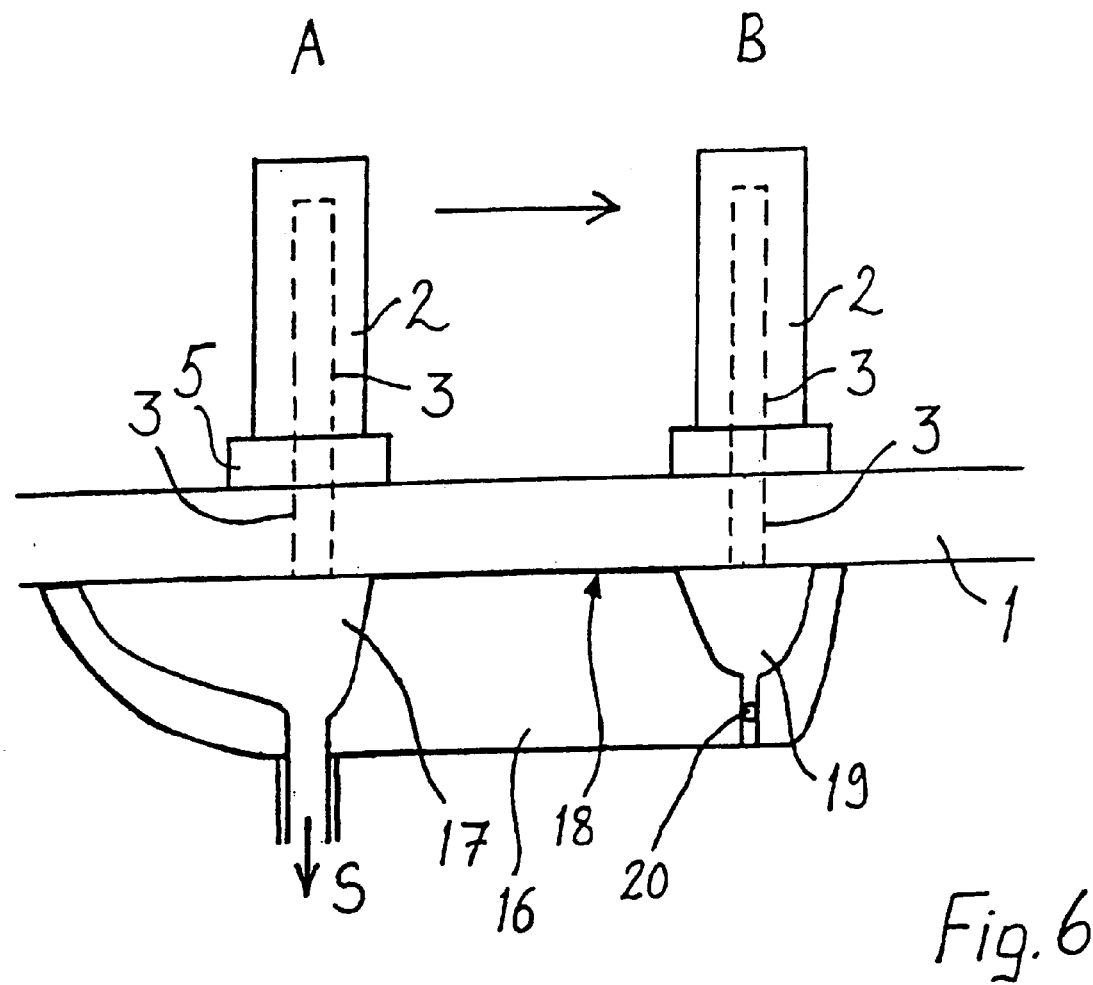
Figure 7:
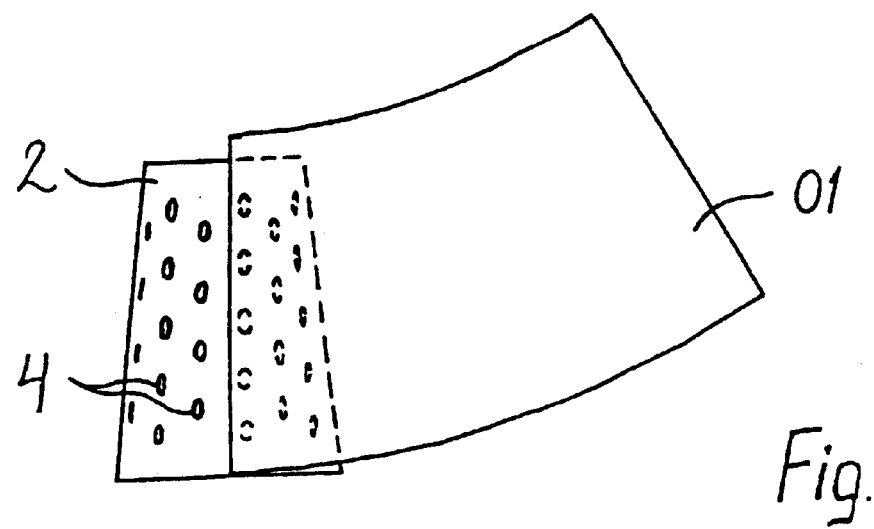

In the following, the present invention is described in more detail with reference to the attached drawings in which FIG. 1 illustrates a longitudinal cross-section of a can forming a part of the container, FIG. 2 is a view of the container-forming unit, seen from above, in which a container-forming apparatus in accordance with the present invention is used, FIG. 3 is a side view of the container-forming apparatus, FIG. 4 is a side view of the wrapping mandrel and the auxiliary wrapping means used in the said apparatus, FIG. 5 is a schematic diagram illustrating the forming stage of the casing of the container, FIG. 6 shows in vertical section the transfer of the wrapping mandrel between two successive stations and the arrangement of suction at these stations, and FIG. 7 illustrates the forming of a container of an alternative form.

For the purposes of this document the following terms are used for the different parts of the liquid container:

Container: sales package or casing according to context.

Sales package: finished and closed liquid container filled with the desired contents.

Casing: unfilled and unclosed outer shell of the sales package.

Can: container which characteristically has a part wrapped to form a closed structure in horizontal cross-section through the longitudinal axis i.e. a sidewall blank closed at one or both ends with an end member.

Sidewall blank: straight, plane part usually made of liquid packaging board, which when connected together form the casing, and which can be cut from a material with larger area, for example, from a long strip.

Outer surface of blank or blank material: surface which in a finished container forms the surface visible to the outside and which is usually provided with printing and a heat-sealable coating.

Inner surface of blank or blank material: surface, which in the finished container forms the surface in contact with the contents and which is usually provided with a heat-sealable coating.

Blank material: raw material for blanks, usually liquid packaging board with heat-sealable coating.

The packaging machine incorporates a container-forming unit, in which is formed the vertical portion of the can-shaped casing having a closed structure in the horizontal cross-section i.e. the casing O illustrated in FIG. 1, to which the end member P closing the open end of the said casing is joined. The thus obtained can-shaped container with one end still open is advanced to the filling unit of the packing machine, in which the final sales package is formed. The filling unit is not described in detail here.

The container-forming unit illustrated in FIG. 2 has a transfer table 1 rotating in the horizontal plane and on its perimeter there are, at fixed angular intervals, forming members which support the said container at its different forming stages. The forming members are identical to one another and each of them comprises a vertical mandrel 2, around which the sidewall blank for the casing is formed and which is hereinafter called the wrapping mandrel.

In addition to the transfer table 1, the container-forming unit comprises a fixed frame, on which the table rotates, and which is marked generally with the reference number 10. The frame incorporates a number of processing stations corresponding to the number of wrapping mandrels 2, and at each station is performed a specific forming stage of the can which is open at one end. At the stop stage, during which the processing stations perform certain operational phases, the mandrels are at the processing stations, and at the advancement stage they are advanced with a short rotational movement of the table, corresponding in length to the angular distance between the wrapping mandrels 2, to the next station for the next processing stage.

In the following, the different processing stations are described in more detail, mainly according to the task they perform in forming the can-shaped casing. At all the stations there are parts attached to frame 10, which with their movement or other function perform the desired operational phases. The moving parts are located on the frame mainly outside the circular track of the wrapping mandrels, and/or above the mandrels or they are placed in such a way that they are temporarily on the track of the mandrels and they move out of the way of the mandrels for the duration of the advancement stage. These different parts are not illustrated in more detail in FIG. 2, but the figure only represents the supporting structures of the different stations, to which the functional parts described above are attached.

A blank of a fixed height is cut from the lower end of the blank web, which blank is transferred to wrapping station A with the aid of transfer devices on the frame of the station. The blank is pushed against the wrapping mandrel 2 and wrapped around it in the shape determined by the outer surface of the mandrel. The body of the can-shaped casing is then formed. The horizontal section of the body has a closed shape, in the case of a cylindrical mandrel the shape being round.

At the sidewall sealing station B, the sidewall margins of the blank which have been made to overlap at the wrapping station are permanently sealed together. This is done with the aid of a pressing surface, which presses together the margins on top of each other and which at the same time cools the heat-seal coating on the inner surface of the blank, which was earlier heated to bonding state.

At the preheating station C hot air is blown inside the side-sealed part towards its upper end, whereby the heat seal coating on the inner surface of the blank material at this point is heated to a suitable temperature.

At the end member station D, end members corresponding in their outlines to the shape of the horizontal section of the body of the casing are separated by die cutting from the continuous blank web M fed to the station, after which the end member is forced through an opening, whereby the edges of the end member are simultaneously folded. After this, the end member is pressed down onto the open upper end of the casing using the end face of the wrapping mandrel as a countersurface in such a way that the folded-up outer edges of the member are pressed against the inner surface of the casing.

At the first heating station E, hot air is blown onto the outer surface of the end member, directing it towards the edges, thereby heating the lower surface of the member at the edge folded up towards the inner surface of the upper end of the casing.

At the second heating station F, the same process is repeated in order to ensure proper heating of the whole perimeter of the upper end.

At the clenching station G, the upper edge of the casing, which is above the upward folded edge of the end member, is folded by pressing it from above towards the centre and down, whereupon the upper edge folds over the end member's outer edge, which is folded up.

At the first end sealing station H, the skirt of the casing is pressed against the folded- up edge of the end member, whereupon the heat-seal coatings heated at the previous heating stages adhere to each other, and the folded-up outer edge of the end member remains permanently inside the upper edge, which is folded into a U-shape.

At the second end sealing station I, the same operational phases as at the previous station are repeated with different parts in order to make a uniform seal around the whole perimeter of the can-shaped casing, which is already finished at this stage.

At the last processing station, at the container removal station J, the can-shaped casing is lifted up off the wrapping mandrel 2 and is advanced along the conveyor track to the filling unit of the packaging machine.

When the finished can is removed from the wrapping mandrel 2, the mandrel moves again with a short rotational movement of the table 1 to the wrapping station A to take a new sidewall blank, and the processing stages described above are repeated.

A typical processing time at each station A–J is around 500 ms, which includes the transfer from one station to a next. Therefore the container can be formed in the container-forming unit in approx. 5 seconds, and the production capacity is 1 can/0.5 s i.e. approx. 120/min.

FIG. 3 illustrates the apparatus for forming a container according to the present invention, which apparatus includes the wrapping station A and the wrapping mandrel 2 brought to the wrapping station.

The blanks forming the outer shell of the containers are brought as a continuous blank material, blank web L, which is liquid packaging board, from the stock reel R guided by two rolls 11, which, between them, advance the blank web L towards the wrapping station A. Before descending to the station A, the web L forms an upward curving loop, whose height is monitored by photocells 12. When the height of the loop has descended to the level controlled by the lower photocell, more web is fed upwards by turning one of the rolls 11, which is the driven roll, until the height of the loop reaches the level controlled by the upper photocell.

After the loop, the web is guided by guiding means to the vertical conveyor track. This web L runs straight down to the wrapping station A between and guided by the transfer belts 14, which are incorporated in the frame of the container-forming unit. There are two pairs of transfer belts 14 close to the outer edges of the web L, and in pairs the belts support the web from opposite sides with the aid of idlers which are against the rear surface of the belt. The belts can be so-called timing belts and the idlers and the drive wheels of the belts correspondingly gear wheels. In the vertical path of movement of the web L there is also a notching member 13, which cuts a notch in the edge of the web L at fixed intervals i.e. at the cutting lines of the blanks to be cut, in order to avoid overlapping of the end folds. The printed marks. in the web L are read by a photocell which controls the transfer belts 14 in such a way that the points to be notched are correctly positioned. This printed mark reader is marked with reference number 21.

At the height of the transfer belts, in the frame of the unit, there are also heating devices 15, such as air nozzles, which heat the outer edges of the blank web at the surfaces which come together in the seal at the wrapping stage i.e. one edge on the outer surface of the blank and the other edge on the inner surface of the blank. Thus the heat-sealable coatings on the outer and the inner surfaces of the blank is heated to a suitable temperature. The nozzles open next to the transfer belts 14 close to the free edge area of the web. Because the blank web L is moved downwards by impulses by the transfer belts 14, the web is always subjected to heating to a certain height when the web is stopped, and this distance is sufficient as regards the height of the blank to be cut. Both of the nozzles are placed in such a way that they aim the heating air at the surface of the blank web in the area between the cutting lines, but leave the cutting line unheated in order that the coating softened by the heating does not impair the cutting. The height of the area affected by the nozzles may also be equal to the vertical length of the blanks, for instance a multiple of the vertical length of the area to be heated on the blank, and also in this case the air flow from the nozzle is directed in such a way that the cutting points are left unheated.

The blank web L is advanced and stopped by the conveyor belts 14 in such a way that the lower edge of the web is at the right level for the cutting of the blank and the part above the lower edge is within the range of the pusher plate A2 which is behind the web, and simultaneously a holding suction is exerted on the blank from the pusher plate through the suction openings in the surface of the pusher plate (not illustrated).

Below the transfer belt pairs, at the wrapping station A, in the frame above the pusher plate A2, is arranged a cutter A1, so as to move back and forth, which cutter comprises a straight sharp blade which, with one stroke directed towards the wrapping mandrel and at the outer surface of the blank web ending at the fixed countersurface A8, cuts from the lower end of the blank strip, along the horizontal cutting line, a blank O1 of a certain height. The blank O1 forms the casing's sidewall blank of a certain closed shape in its horizontal section, the shape being determined by the wrapping mandrel 2 brought to the wrapping station A and described later in more detail. As mentioned above, the lower edge of the blank and simultaneously the cutting line are positioned correctly before cutting. This is performed, in practice, with the aid of the printed mark mentioned previously, the photocell detecting the printed mark and the transfer belts 14.

FIG. 4 illustrates in more detail the wrapping mandrel 2 around which the casing O is formed. The mandrel corresponds in shape to the shape of the inner portion of the container, and on its outer surface there are openings 4 connected to air duct 3 brought from below, with the aid of which openings the blank O1 can be sucked onto the wrapping mandrel. There are openings around the whole perimeter of the mandrel and also at different heights in the direction of the longitudinal axis of the mandrel, in order to generate suction on the entire outer surface of the mandrel. The air duct 3 forms inside the mandrel 2 a hollow space, in which the suction is exerted by means of an arrangement described later and from which bore holes branch out radially, ending at the openings 4. Additionally, there is in the suction mandrel, between the hollow space and the outer surface, a set of cooling medium ducts (not illustrated) separate from the suction system.

The blank O1 is pushed with a short movement of the pusher plate A2 towards the wrapping mandrel 2 while the holding suction holds the blank to the front surface of the mandrel, after which one of the vertical edges of the blank is against the outer surface of the mandrel. The surface of the pusher plate and correspondingly the blank are parallel with respect to the outer surface of the mandrel with which the blank first comes into contact, but the path of the pushing movement is obliquely downwards (arrow), which enables easier placement of different structures in front of the cutting line, which structures will not obstruct the blank, and the wrapping mandrel 2 can at the same time be brought close to the pusher plate. The path of movement of the pusher plate A2 may, however, also be horizontal i.e. perpendicular to the outer surface of the mandrel 2.

Behind the blank O1, the surface A3 of the pusher plate's edge area which presses the edge area of the blank against the mandrel 2, corresponds in its horizontal section to the outer surface of the wrapping mandrel, i.e. is concave, so that a small sector of the edge of blank is already at this stage against the mandrel. Because of the suction effect of the suction openings 4 at this point on the wrapping mandrel, the edge of the blank O1 remains held against the mandrel. When the pusher plate has pressed the blank against the wrapping mandrel 2, the holding suction on the front surface of the plate is released. After this the pusher plate draws back to its original position and the lower end of the blank web L brought from above can be lowered again in front of the pusher plate for new cutting and pushing of the blank.

FIG. 5 illustrates schematically in horizontal section the progress of the blank wrapping stage of the blank. The blank O1, which is held with the aid of suction against the wrapping mandrel 2 by the inner surface of one edge, is wrapped once around the mandrel 2 while the suction from the suction openings 4, which run in succession in the direction of the perimeter of the mandrel, pull the free part of the blank O1 closer to the mandrel and against the outer surface of the mandrel. The inner surface of the blank is then entirely against the outer surface of the mandrel 2. Simultaneously, the heat-seal coating which is on the inner surface of the second, free vertical margin of the blank O1 and which has been heated to bonding state by heating device 15, is placed on top of the first, vertical margin of the blank, which is also in the bonding state and the sidewall blank of the casing is shaped, the form of the casing being determined by the outer surface of the mandrel. The width of the blank O1 i.e. the distance between the vertical edges is naturally determined with reference to the diameter of the mandrel, in such a way that the overlapping part on the edges of the blank is broad enough to ensure a durable seal.

There are, on the outer surface of the mandrel 2, viewed in the horizontal section, suction openings 4 distributed at fixed intervals around the whole perimeter of the mandrel and also on its whole height, i.e. openings are distributed sufficiently densely on the whole area of the vertical outer surface of the mandrel. Additionally, the openings 4 are connected to each other by grooves made in the surface in order to allow the suction to have an effect in the area between the openings (FIG. 4). This structure enables a strong suction to be exerted, which already in itself can be sufficient to pull the inner surface of the blank O1 tightly against the outer surface of the mandrel. Because the suction may at first be fairly weak and the suction force grows as the blank to be wrapped around the mandrel gradually covers more openings, it may be advisable in wrapping the blank around the mandrel, especially if the blank is made of a rigid material, to use also auxiliary means such as air jets directed from outside and towards the portion of the blank not yet against the mandrel 2 and which press the blank against the mandrel 2, or alternatively mechanical auxiliary means. The purpose of these means is to press the end part of the blank not yet against the outer surface of the mandrel 2 closer to the mandrel, because the final pressing of the blank against the mandrel is always produced by means of suction. These auxiliary forces directed towards the outer surface of the blank are illustrated with arrows in FIG. 5. When using air jets, at least some of the air jets can be produced with the aid of air nozzles arranged on the pusher plate A2, which air nozzles are arranged on the area of the plate situated behind the free part of the blank O1 or attached to the pusher plate outside this surface pressing the blank O1, whereby, if situated on the side of the plate, they can be directed appropriately. The air nozzles are connected to compressed air, and they can start to function as soon as the holding suction of the pusher plate is released.

In the following, a mechanical auxiliary wrapping means is described. When the pusher plate A2 has pushed the edge of the blank O1 against the mandrel, the vertical securing arm A5 arranged so as to rotate around the mandrel moves through the upright notch A4 in the pusher plate A2 in the direction of the pushing movement from behind the pusher plate onto the outer surface of the blank and starts during its rotational movement to force the blank O1 closer to the mandrel 2. The said notch A4 is for the most part the height of the pusher plate, and it separates on the edge of the plate from the rest of the pusher plate A2 provided with holding suction, a strip with a concave pressing surface A3 mentioned hereinbefore, which strip presses the edge of the blank against the mandrel. When the securing arm A5 has moved to the front side of the pusher plate A2, the pusher plate can immediately return to its original position at the back. As illustrated in FIG. 4, the securing arm A5 has been attached to a structure A6 arranged so as to be rotating above the mandrel 2. The structure A6 can, for instance, be a wheel which is rotated with a belt transmission A7 or by other means, and whose vertical rotation axle determines the orbit of the arm around the mandrel 2. The arm's orbit, which is illustrated with a broken line in FIG. 5, can be eccentric with regard to the centric longitudinal axis 2a of the mandrel in such a way, however, that a long enough part of the one, free end of the edge of the blank O1 is outside the orbit in order that the arm can press the blank closer towards the mandrel. The orbit has also been arranged in such a way that, at the point where only a short part of the blank is free and not against the mandrel, the track of the securing arm A5 is closest to the mandrel 2 in order that the free vertical edge is certain to turn onto the vertical edge first pressed against the mandrel. The track can in this place be almost at a tangent to the outer surface of the mandrel 2. When the securing arm A5 has turned a full circle and has pressed the free edge of the blank onto the first edge at the sealing point, it moves back a little to a position where it does not prevent a new mandrel from moving to the wrapping station A to take a new blank O1, which is pushed with the pusher plate A2. It is, however, possible that the securing arm is in contact with the blank only at the beginning of the wrapping stage, because when the openings 4 are gradually covered with the blank in the direction of the perimeter, the suction effect also increases. The securing arm A5 can then remain directly in its original position inside the track of the mandrels 2.

In FIG. 5, the arrow A9 illustrates again the air impingement which is arranged so that it is exerted in the wrapping direction before the seal point, towards the surface of the mandrel 2, in order to ensure that the end of the blank O1 is pressed against the mandrel and the other edge of the blank. This air impingement, which can be arranged with a nozzle or a set of nozzles as a narrow air jet of a certain height, can be used especially in conjunction with the mechanical auxiliary wrapping means.

When the blank O1 has been attached to the outer surface of the wrapping mandrel 2 in the manner described above, the mandrel with the blank around it moves along a horizontal track to the next station, sidewall sealing station B, where the vertical surface to be cooled is pressed with a horizontal movement against the sealing point, whereby the surfaces of the overlapping edge portions of the blank which are against each other, are firmly pressed together, the heat-seal coating in bonding state on the inner surface of the one, free edge of the blank cools quickly, and the seal becomes durable, and thus the casing O is formed. At the following stages, an end member is attached to the end of the casing O around the mandrel 2 by pressing it from above into the opening which is in the upper end of the blank, which has a closed perimeter in the horizontal section.

FIG. 6 illustrates how the suction is generated in the wrapping mandrel 2. The wrapping mandrels are attached in a vertical position on the perimeter of the transfer table 1, which is arranged so as to rotate in impulses around the vertical rotation axis. The figure illustrates the wrapping mandrels 2 at the wrapping station A and at the sealing station B. For the sake of clarity, the processing members at the stations A and B are not illustrated, and also the wrapping mandrels are depicted without the casing O around them. The air duct 3 connected to the suction openings 4 extends through the transfer table 1 as air duct 3, which opens onto the lower surface of the table. Against the lower surface of the table, in the frame 10 of the container-forming unit there is a fixed suction member 16, made for example of plastic, which members surface is tightly against the moving surface of the transfer table 1. The suction member 16 incorporates a suction chamber 17, which is connected to suction generated by the normal equipment, the suction being illustrated schematically the arrow S.

In sidewall sealing station B, the suction member 16 incorporates another suction chamber 19, which is connection to the same suction S as the suction chamber 17, through the pressure reducing point 18, which passes from suction chamber 17 to the other suction chamber 19. Because of this, there may be a greater underpressure in suction chamber 17 than in suction chamber 19, in a situation in which the blank is entirely wrapped around the mandrel 2 in the form of casing O covering the suction openings 4. Structurally, the pressure reducing point 18 has been formed by making in the surface against lower surface of the transfer table of the suction member 16 a shallow groove, which connects the chambers 17 and 19. In the duct, between the second suction chamber 19 and the open air at normal pressure there is a regulating member, for instance a throttling screw 20, by means of which the underpressure in the chamber 19 can be adjusted.

When the wrapping mandrel 2 moves to the wrapping station A to receive the blank O1, the air duct 3, which runs through the transfer table 1, slides simultaneously to meet the suction chamber 17 of the suction member, and suction begins immediately in the mandrel 2. When the blank O1 has been wrapped around the outer surface of the mandrel, the mandrel moves to the sidewall sealing station B, whereupon the air duct 3, which runs through the table, now comes into contact with the second suction chamber 19, which has a lower underpressure. Thus, for the duration of the side sealing, suction is again obtained in the mandrel and the suction secures the blank O1 around the mandrel during the side sealing. The lower underpressure ensures that the casing O, which during the side sealing is shaped to its final peripheral dimensions, is not formed too tightly around the mandrel 2 in order to make its subsequent release easier. During the transfer movement, the shallow groove between the chambers 17 and 19 is in contact with the opening of the air duct 3 on the surface of the table and ensures that the suction does not stop during the transfer to the sidewall sealing station. The sidewall sealing station can also be completely without suction, whereupon the suction chamber is only in the wrapping station, provided that the transfer to sidewall sealing station and the side sealing is rapid.

When the suction mandrel 2 moves from the sidewall sealing station B, it moves out of range of the suction member 16, and the remaining processing stages in stations C–J can be performed without suction. It is, however, possible also to exploit the set of ducts which runs through the mandrel 2 and the table 1 at the processing stations where it is necessary to hold the can/casing in place.

Alternatively, the suction member 16 can also be against the arc-shaped side edge of the transfer table, whereupon its principle of structure is exactly the same, but then the air ducts 3 of the table open onto the side edge of the table instead of the lower surface, and the suction chambers are adjacent to this side edge. However, the side edge of the table must then be high enough i.e. a certain minimum thickness of the table is required.

In addition to the air duct 3 and the suction openings 4 described, there are in the suction mandrels also ducts for a cooling medium such as water. These ducts are connected to inlet and outlet ducts, which are passed through the table 1. This cooling medium circulation which is intended to prevent the excessive heating of the mandrel at different processing stages is not described in more detail.

The figures illustrate the cylindrical form of the wrapping mandrel 2, from which it follows that the outer casing to be formed is also of cylindrical form. The mandrel may then be slightly tapered, i.e. its diameter at the upper end i.e. at the free upper end, may be slightly smaller than at the lower end, in order to make removal of the blank easier. However, the present invention is not limited to cylindrical mandrels and packages of similar form, but the horizontal section of the mandrel and the correspondingly wrapped blank can also comprise straight parts which are connected to each other at rounded corners; for instance the mandrel can in its horizontal section be square shaped with rounded corners. In all these cases, the blank O1 to be cut before the wrapping is of rectangular shape, in which case its width i.e. horizontal dimension corresponds to the length of the outer perimeter of the wrapping mandrel 2, to which length is added the width of the side seal. It is, however, possible also to use a wrapping mandrel which clearly tapers upwards, whereupon the horizontal section of the mandrel is not constant but decreases upwards in the vertical direction and the mandrel resembles in its three-dimensional shape a truncated cone in principle, a rectangular blank can be wrapped around such a mandrel, in which the side seal will not be equal in width, and the upper and lower edges will not be equal, especially in cones with a large angle of point. For better correspondence, the blank O1 to be cut can be shaped in the form of a straightened conical shell. FIG. 7 illustrates such a blank O1 and a wrapping mandrel 2. In this case, too, the wrapping is performed in analogically with regard to the cylindrical mandrel. Because of the special shape of the blank O1, they are best separated from the larger material by pouncing, and they can be fed one by one onto the pusher plate. When using the securing arm with a cone-shaped mandrel, the securing arm can be parallel to the vertical central axis of the mandrel, because the purpose of the arm as an auxiliary device is only to secure the wrapping of the blank around the mandrel and the actual process whereby the blank takes its shape is always performed primarily with the aid of suction. It is, however possible also to arrange this securing arm in such a direction that its rotational movement follows the cone-shaped shell. It is also possible to use air impingement from outside with this solution.

The figures also illustrate an elevating ring marked with a reference number 5 at the lower end of the mandrel 2, with which elevating ring the position of the blank/casing around the mandrel can be adjusted. The elevating ring 5, which is guided by an appropriate control track (not illustrated), elevates the blank/casing at stations C–J, in order to facilitate processing of the upper end of the blank/casing.

In order to produce different movements and to synchronise them, the normal solutions of mechanics and automation, such as pneumatic cylinders, sensors and servo drives can be used. The duration of the suction holding the blank and the auxiliary air jets if used in wrapping can be regulated by means of quick-acting valves, such as solenoid valves. The operational phases at the wrapping stage A, beginning from the stage when the pusher plate A2 starts pushing the cut blank O1 and ending at the stage when the blank has been wrapped around the mandrel 2, can be performed rapidly, and the duration of this stage is characteristically less than 1 s, for instance ca 500 ms.

What is claimed is:

1. An apparatus for forming a container, which is situated in a container-forming unit comprising different processing stations, in which the apparatus for forming a container comprises:

a wrapping mandrel which is attached to a moving structure which is arranged to move the wrapping mandrel between the different processing stations;

members for feeding a blank onto the wrapping mandrel, wherein the feeding members for feeding the blank consist of a pusher plate, which is arranged so as to move back and forth and to push the blank with a forward movement form one edge of it against the outer surface of the wrapping mandrel;

members for wrapping the blank around the wrapping mandrel in order to form a closed structure in horizontal cross-section through the longitudinal axis of the wrapping mandrel; and securing members which are arranged to affect the blank to be wrapped around the wrapping mandrel from the direction of the outer surface, in order to wrap the blank closer to the outer surface of the wrapping mandrel, wherein the securing members consist of a securing part, which is arranged to orbit on a certain track around the wrapping mandrel, wherein the wrapping mandrel is equipped with suction openings distributed on its perimeter, which openings are connected to an air duct in order to wrap the blank around the wrapping mandrel with the aid of suction, wherein there is a notch arranged in the pusher plate, through which the securing part orbiting the wrapping mandrel comes against the outer surface of the blank.

2. An apparatus according to claim 1, wherein the securing members consist of air impingement means arranged around the wrapping mandrel and directed towards the outer surface of the blank.

3. An apparatus according to claim 1, wherein the front surface of the pusher plate, which surface is at the contact point with the blank and the outer surface of the wrapping mandrel is arranged to be a concave pressing surface conforming to the curvature of the outer surface of the wrapping mandrel, which surface is against the pressing surface.

4. An apparatus according to claim 3 wherein the air duct is in connection with the suction member, which is immobile with regard to the structure moving the wrapping mandrel, and in which is arranged a suction chamber in connection with the suction, which chamber is situated in the apparatus in such a way that when the wrapping mandrel stops at the wrapping station the air duct and the suction chamber meet.

5. An apparatus according to the claim 4, wherein in the suction member there is another suction chamber which is situated in the apparatus in such a way that when the wrapping mandrel stops after the wrapping station at the sidewall sealing station the air duct and the second suction chamber meet.

6. An apparatus according to the claim 5, wherein the apparatus comprises regulating members in order to cause underpressure of different magnitudes in the first suction chamber and in the second suction chamber.

7. An apparatus according to claim 6 wherein the structure moving the wrapping mandrel is a plate-like structure such as the transfer table on which surface the wrapping mandrel is arranged so as to rise from it.

8. An apparatus according to claim 7, wherein the suction member is arranged against the surface of the plate-like structure, which surface is on the opposite side of the plate with respect to the wrapping mandrel whereby the air duct is led through the plate-like structure to connect with the suction chamber of the suction member.

* * * * *